June 29, 1926.
R. W. HANNA ET AL
1,590,505
APPARATUS FOR DETERMINING THE LEVEL OF HEATED LIQUID IN A VESSEL
CONTAINING BOTH THE LIQUID AND ITS VAPOR
Filed Jan. 16, 1920
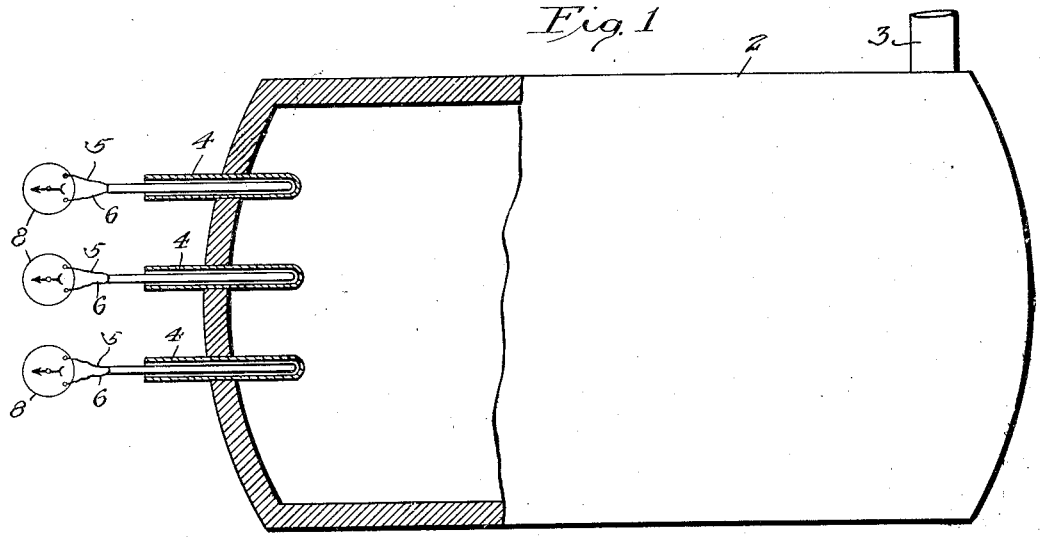
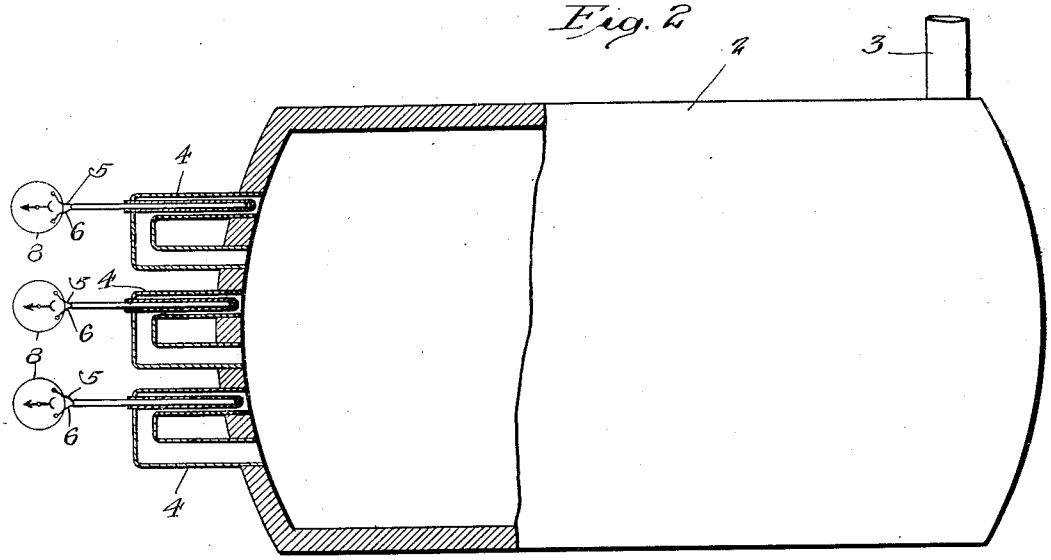
WITNESS
INVENTORS
Richard W. Hanna
William D. Mason
ATTORNEY Patented June 29, 1926.

1,590,505

UNITED STATES PATENT OFFICE.

RICHARD W. HANNA AND WILLIAM D. MASON, OF RICHMOND, CALIFORNIA, ASSIGNORS TO STANDARD OIL COMPANY OF CALIFORNIA, OF SAN FRANCISCO, CALIFORNIA, A CORPORATION OF CALIFORNIA.

APPARATUS FOR DETERMINING THE LEVEL OF HEATED LIQUID IN A VESSEL CONTAINING BOTH THE LIQUID AND ITS VAPOR.

Application filed January 16, 1920. Serial No. 351,980.

This invention relates to an apparatus for determining the level of heated liquid in a vessel containing both the liquid and its vapor, either at ordinary pressure, at atmospheric pressure, or under vacuum.

More particuarly the invention is designed for use in determining the approximate level of oil in a still, evaporator, or container where such oil is under heat, or pressure, or both.

In the distillation of liquids in which either the excessive temperature or high pressure or vacuum would render inapplicable the ordinary form of gage glass, and in which it is necessary to ascertain substantially the level of liquid in the still or vessel, it has hertofore been difficult to determine this level with any degree of accuracy. It has been possible to approximate this determination by the use of a series of pet cocks arranged at various levels in the apparatus. This method has been found unsatisfactory and dangerous, particularly where the relative pressures inside and outside of the still or vessel widely differ, as for instance, in the cracking of petroleum where the temperature may be as high as 800° F. and the inside pressure may be in excess of 50 pounds per square inch.

The object of my invention is to provide an apparatus for determining the level of the oil or liquid, which apparatus shall be at once accurate and safe, and by which the desired measurements of such level may be made and determined at a distance from the still or vessel.

Our improved apparatus includes in the location in a still or vessel at respective levels, of temperature measuring or indicating means, one of such means arranged at such a level as to be covered by or immersed in the hot liquid and the other thereabove and extending into the vapor arising from such liquid whereby the two indications of temperatures thus indicate that the level of the liquid lies between these two measuring means. We thus utilize the difference in temperatures between the body of hot liquid and its vapor as the means of indicating the level of the liquid as between the two measuring or indicating means.

While our invention is particularly adapted for use in connection with the distillation of petroleum oils under high temperatures and pressures, it is not necessarily limited thereto. In the distillation of petroleum oils under high temperature and pressure there is a marked difference between the temperature of the liquid and the temperature of the vapor, of which the following will serve as an example: Assume a closed still or evaporator with only the usual vapor outlet. If a pyrometer be inserted in the head of the still just below the level of the liquid if the temperature of the liquid is indicated as 750° F., the temperature of the vapor thereabove as indicated by a second pyrometer located at a level approximately six inches above the first pyrometer, will be approximately 725° F. Obviously the level of the liquid is between these two pyrometers or temperature indicating devices.

In the accompanying drawings we have illustrated in Figure 1 a still or evaporator provided with a plurality of temperature indicating or measuring devices by which means the level of the oil may be thus determined, and in Fig. 2 we have indicated a preferred embodiment of such indicating or measuring means.

In the drawings the still or evaporator 2 is adapted to contain the liquid which is to be distilled or heated; 3 indicates a vapor outlet which may be connected to the usual condenser in the ordinary or any preferred manner. In the drawings we have indicated in Fig. 1 a series of three temperature indicating or measuring means, such for example, as the well known pyrometer 4, each pyrometer being connected by suitable wires 5, 6 with a suitable galvanometer 8 for indicating the temperature of such pyrometer. These galvanometers may be arranged at any suitable distance, as desired, from the still or vessel in which the liquid is being heated or distilled.

In Fig. 2 we have shown a preferred arrangement of pyrometers. In this figure of the drawings each pyrometer is inserted into the upper arm of a horizontally disposed U-shaped tube, both arms of which are open into the still.

This arrangement is particularly applicable where the temperature and pressure within the still are high and the boiling liquid approaches its vaporizing point, at which temperature and pressure the temperatures of the hot liquid and of its vapor closely approach each other.

With the arrangement thus illustrated in Fig. 2 if the level of the oil is above a given pyrometer, both arms of the U-tube thereof will be filled with the hot liquid maintained therein by hydrostatic pressure. It is obvious, however, that the upper arm of any U-tube which is not completely immersed in the liquid will remain cooler than the lower arm filled with the liquid by reason of the radiation of heat from the surface of the exposed tube. It is also obvious that as soon as the level of the liquid in the still reaches the level of such upper arm of such U-tube, the tube will be filled with liquid since both arms are open to the interior of the still. In this latter case the radiation of heat from the surface of the U-tube causes a further action. The liquid with which the tube is completely filled is cooled to a temperature somewhat lower than that of the body of the liquid in the still, so that it becomes relatively denser than the bulk of the liquid. It, therefore, tends to flow downward through the curved portion of the U-tube and back into the still, thereby drawing hot oil from the still into the upper arm of the U-tube, maintaining circulation of hot oil in the U-tube in the manner of a thermal siphon. By this means a lesser degree of variation of temperature is indicated or measured by the given pyrometer so that the indication or measurement of temperature thus attained is much more sensitive to slight changes in degree.

While we have thus explained our apparatus as applied to the use of the well known pyrometer, we do not necessarily limit ourselves to the use of a pyrometer since a similar use may be made of any instrument capable of determining measuring or indicating temperatures in substantially the manner and for the purpose described.

Essentially our invention consists in the application of temperature indicating or measuring instruments or means in such a manner as to show or indicate a difference of temperatures at different levels in the vessel, such temperatures being the temperatures respectively of the hot liquid and of its resultant vapor, thus establishing the fact that the liquid level is between the respective levels of such instruments or means. By using a series of such indicating or measuring means arranged at such relative levels to each other as may be advantageous or desirable with respect to the distilling operation to be carried on, it is possible to readily determine the liquid level within the desired limits.

An important feature of applicant's apparatus which enables an accurate determination of the liquid level within the vessel resides in the employment of such U-tubes as form what may be called dead end spaces in communication with the vessel, which spaces are removed from the circulation or agitation of the contents of said vessel so that there is provided such dead end spaces in the U-tubes which will be substantially unaffected by the turbulence of the liquid within the vessel proper. The pyrometers being located in these dead end portions of the U-tubes will not register the temperature which exists in the vapors or oil occupying the still proper. The result of U-tubes being external to the main body of heat within the still is that a very rapid radiation of heat from the U-tubes takes place. Accordingly, these U-tubes which are not filled with oil but merely with the vapor of the oil through this rapid radiation of heat condenses the vapors therein and accordingly bring the U-tubes to a temperature many degrees below the temperature of the vapor in the still. There is thus obtained a temperature reading very greatly lower than the oil undergoing distillation and very markedly lower than the temperature readings which will be obtained from pyrometers located within the U-tubes which are entirely filled by the liquid contents of the still or vessel. Where the U-tubes are filled with oil, the radiation of heat therethrough merely causes a circulation of oil through the U-tubes with the result that although the pyrometers therein may not register quite so high a temperature as the true temperature of the oil, it will register a high temperature correctly proportional to such oil temperature.

As an illustration of a practical operating condition, without intent to confine the invention to such illustration, a still provided with four of such U-tubes and pyrometers located at progressively lower points along the still, indicated the following temperatures:

|  | Degrees F. |
| --- | --- |
| No. 1 | 162 |
| No. 2 | 170 |
| No. 3 | 175 |
| No. 4 | 527 |

Still temperature 660° F., illustrating clearly that the oil level of the still is between pyrometers Numbers 3 and 4.

We claim:

1. An apparatus for determining the level of a liquid oil undergoing distillation in a vessel, comprising a plurality of temperature indicating or measuring means positioned within horizontally disposed U shape tubes having both arms open into the vessel, said U-tubes being disposed at vertically spaced apart points along the vessel, the tubes being disposed sufficiently outside of the vessel to radiate heat so that when filled with oil cooling of the oil will cause the circulation of oil therethrough and when the upper end is filled with vapor the condensation of the vapor will cause a marked lowering in the resultant indicated temperature, thus positively indicating the level of the oil within the vessel.

2. An apparatus for determining the level of a liquid oil undergoing distillation in a vessel, comprising a plurality of temperature indicating instruments positioned within U-tubes having both arms opening into the vessel, the U-tubes being disposed at vertically spaced-apart points along the vessel, the upper arms of the U-tubes being disposed outside the vessel so as to be adapted to rapidly radiate heat, whereby when said tubes are filled with oil the radiation of heat from the upper arms of said tubes will cause circulation of oil therethrough, and when the upper arms of said tubes are filled with vapor, the radiation of heat will cause condensation of the vapor therein, producing a marked lowering in the resultant indicated temperature.

3. An apparatus for determining the level of a liquid undergoing distillation in a vessel, comprising a plurality of temperature indicating instruments positioned within horizontally disposed U-shaped tubes, said U-tubes being located at vertically-spaced-apart points along the vessel, the upper arms of the U-tubes being disposed outside the vessel so as to be adapted to rapidly radiate heat so that the resultant cooling will cause the circulation of the liquid thru those tubes which are below the liquid level within the vessel thus giving an indicated temperature within said tubes closely approximating the temperature of the oil within the vessel, and so that the radiation from the tubes which are above the liquid level will cause condensation of vapor therein thus producing a marked lowering of the indicated temperature of the vapor within said latter tubes whereby the level of the liquid within the vessel is positively indicated.

4. An apparatus for determining the level of a liquid undergoing distillation in a vessel, comprising a plurality of temperature indicating instruments positioned within horizontally disposed U-shaped tubes, said U-tubes being located at vertically-spaced-apart points along the vessel, the upper arms of the U-tubes being disposed outside the vessel so as to be adapted to rapidly radiate heat so that by this radiation and the resulting condensation of vapor in those U-tubes which are above the liquid level there will result a marked lowering of the indicated temperatures of said latter U-tubes, thus positively indicating, by the position where this marked lowering of indicated temperature occurs, the level of the liquid within the vessel.

Signed at Pt. Richmond, California, this 8th day of January 1920.

RICHARD W. HANNA.
WILLIAM D. MASON.